Aug. 19, 1924.

M. L. WARNER

ELECTRIC GRIDDLE

Filed March 1, 1924

1,505,681

SECTION 3-3

Inventor
Maurice L. Warner
By his Attorney
H. G. Manning

Patented Aug. 19, 1924.

1,505,681

UNITED STATES PATENT OFFICE.

MAURICE L. WARNER, OF AMHERST, MASSACHUSETTS.

ELECTRIC GRIDDLE.

Application filed March 1, 1924. Serial No. 696,129.

*To all whom it may concern:*

Be it known that I, MAURICE L. WARNER, a citizen of the United States, and a resident of Amherst, county of Hampshire, and State of Massachusetts, have invented certain new and useful Improvements in Electric Griddles, of which the following is a specification.

This invention relates to electric heating devices and more particularly to an electric griddle for cooking pancakes and the like.

One object of the invention is to provide an electric heating griddle having a flat heating surface formed from a material which is not only an electrical insulator, but at the same time is a conductor of heat.

A further object is to provide an electrically heated griddle in which the heating member is formed from a material having lubricating qualities and through which a heating wire is adapted to be threaded in serpentine fashion.

A further object is to provide an electrically heated griddle which will be simple, ornamental, compact, inexpensive to manufacture, and very efficient and durable in use.

With these and other objects in view, there has been illustrated on the accompanying drawings one form in which the invention may be conveniently embodied in practice.

Figure 1:
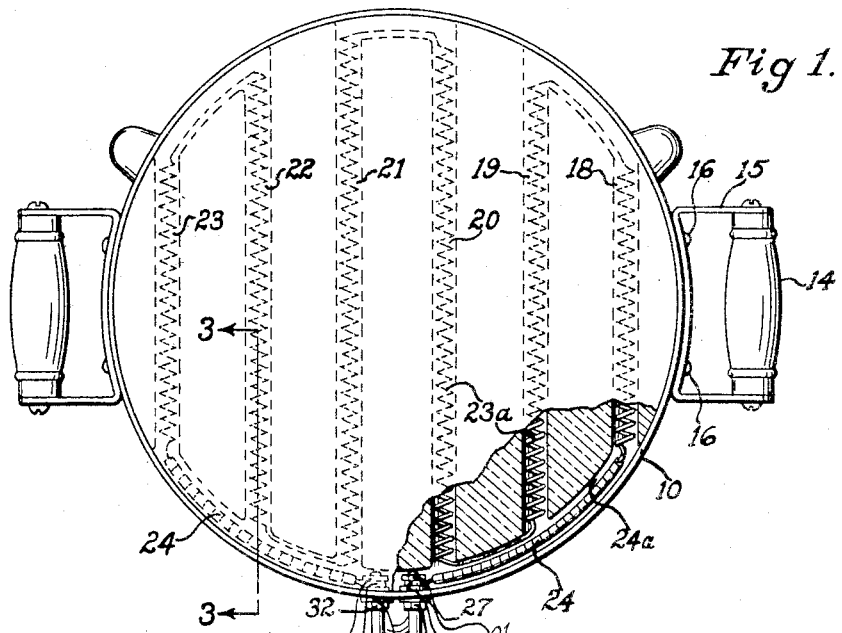
Fig. 1 represents a plan view of the preferred form of electric griddle.
Figure 2:
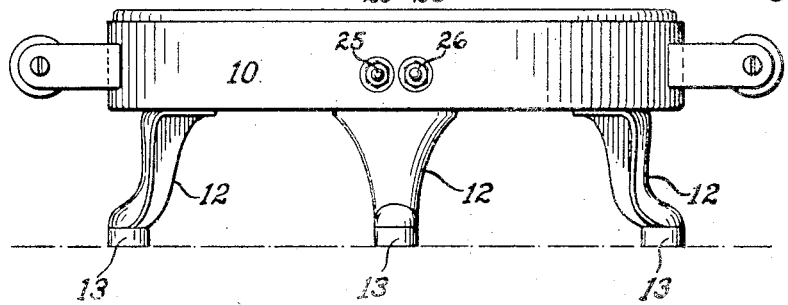
Fig. 2 is a side elevation of the same.
Figure 3:
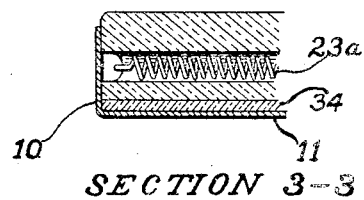
Fig. 3 is a fragmentary sectional view taken along the line 3—3 of Fig. 1, looking in the direction of the arrows.
Figure 4:
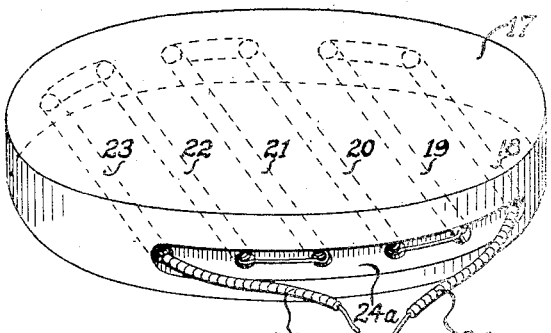
Fig. 4 is a perspective view of the combined heating and cooking unit shown separate from the remainder of the griddle.

Referring now to the drawings, in which like reference numerals denote corresponding parts throughout the several views, the numeral 10 indicates a shallow cylindrical casing or shell open at the top and having a flat bottom 11. The casing 10 is provided with a series of supporting legs 12, three in number in this instance, said legs 12 being attached, as by rivets, to the bottom 11 of the casing. Each of the legs 12 is provided with a rubber button 13 at its foot to prevent possibilty of scratching the surface of the table or other support upon which the griddle is mounted.

In order to facilitate moving the griddle from place to place, a pair of handles 14 are provided at opposite ends of the casing, said handles being supported in U-shaped brackets 15 secured to the casing, in any suitable manner, as by means of rivets 16. The heating unit comprises a flat cylindrical disc-shaped member 17 having parallel top and bottom surfaces and is constructed from a material such as soapstone, which is not only an electrical insulator, but at the same time is a heat conductor and possesses lubricating qualities.

The cylindrical heating unit is perforated by a plurality of parallel cylindrical passages 18, 19, 20, 21, 22, and 23, disposed midway between its top and bottom surfaces.

In order to supply heat to the cylindrical heating unit, a wire 23ª of "nichrome" or other suitable metal is passed back and forth through the passages 18, 19, 20, 21, 22, and 23, previously mentioned. The wire 23ª is preferably coiled within said passages, to provide increased heating capacity therein. The wire 23ª is provided with terminals 24 disposed in a peripheral groove 24ª extending about the rim of the soapstone heating unit 17.

The heating wire 23ª is without insulation except at its terminals 24, where it is provided with so-called "fish-spine" or "macaroni" insulation. A pair of binding posts 25 and 26 pass through one side of the casing 10 adjacent each other, and said posts are threaded at their inner ends to receive binding nuts 27 and 28 for clamping the extremities 29 and 30 of the terminals 24 to said posts 25 and 26 respectively. A pair of insulating bushings 31 are preferably located on said posts adjacent the nuts 27 and 28, said bushings being adapted to insulate said posts from said casing. A pair of locking nuts 32 and 33 are threaded on the posts just outside the casing. The outer ends of the rods 25 and 26 are smooth and are adapted to receive any suitable type of doublesocket electric plug connected to a source of current such as a house lighting system. In order to insulate the bottom of the heating element from the base of the casing, a thin asbestos disc 34 may be provided.

One advantage of the present invention is that the member containing the heating wires also forms the cooking surface, thus avoiding the use of expensive electrical insulators such as mica commonly employed in former heating devices of this general type between the heating and cooking elements.

A further advantage of this invention is that no grease, butter, or other material is required to prevent the food being cooked from sticking to the cooking surface. Consequently, the possibility of objectionable odors due to overheating of such material is entirely eliminated.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an electrically heated griddle, a casing, a combined heating and cooking unit in said casing, said unit comprising an integral flat disc having a series of parallel perforations extending therethrough between its top and bottom surfaces, a resistance wire passing through said perforations, and means for connecting said wire with a source of current.

2. In an electrically heated griddle, a casing, a combined heating and cooking unit in said casing, said unit comprising an integral flat disc having a series of parallel perforations extending therethrough between its top and bottom surfaces, a resistance wire passing through said perforations, and means for connecting said wire with a source of current, the periphery of said disc between said perforations being grooved to receive the exterior portions of said heating element.

In testimony whereof, I have affixed my signature to this specification.

MAURICE L. WARNER.